United States Patent

Barmasse et al.

[15] 3,702,486
[45] Nov. 14, 1972

| [54] | SAFETY RUPTURE ASSEMBLY |
|---|---|
| [72] | Inventors: Alfred C. Barmasse, Northridge; Edmund A. Jachacz, Panorama City, both of Calif. |
| [73] | Assignee: American Safety Equipment Corporation, Encino, Calif. |
| [22] | Filed: Sept. 23, 1970 |
| [21] | Appl. No.: 74,611 |
| [52] | U.S. Cl..........................9/11 A, 137/69, 114/190 |
| [51] | Int. Cl. ..............................................B63b 9/22 |
| [58] | Field of Search.................9/11 A, 2 A, 314, 324; 114/190; 180/150 AB; 137/797, 69; 220/89 A, 446 |

[56] References Cited

UNITED STATES PATENTS

| 3,155,272 | 11/1963 | Summers et al. .........220/89 A |
| 3,034,154 | 5/1962 | Silverstone ...................9/11 A |
| 3,527,475 | 9/1970 | Carey et al. .........280/150 AB |
| 3,573,885 | 4/1971 | Brawn et al. ........280/150 AB |
| 2,079,164 | 5/1937 | Glab............................137/69 |

Primary Examiner—Milton Buchler
Assistant Examiner—Gregory W. O'Connor
Attorney—Miketta, Glenny, Pams & Smith

[57] ABSTRACT

An assembly for rupturing and thereby deflating a life raft situated in its storage compartment in an airplane, when the raft is accidently inflated. The rupture assembly includes a blade and a diaphragm immediately adjacent to the raft. The diaphragm is held away from the blade by a spring resistance. Inflation of the raft causes the diaphragm to move towards the blade overcoming the spring resistance so that the blade cuts through the diaphragm and into the raft to deflate it.

10 Claims, 3 Drawing Figures

PATENTED NOV 14 1972 3,702,486

ALFRED C. BARMASSE
EDMUND A. JACHACZ

BY
*Amster & Rothstein*
ATTORNEYS

SAFETY RUPTURE ASSEMBLY

The present invention relates to a safety rupture assembly, and more specifically to an assembly for rupturing and deflating life rafts, when such life rafts accidentally inflate while in their storage compartments in aircraft or in other vehicles.

Safety rules of various departments of the United States Government as well as state and local safety codes often require certain types of vehicles to carry inflatable life rafts. These safety rules apply to commercial and military airplanes, boats, and other vehicles used to transport both persons and freight. Similar safety codes apply to movement of such vehicles through international air space and the ocean and waterways.

Conventionally, such inflatable life rafts are of the self-inflating type. Typically, a life raft may carry one or more cartridges of gas under high pressure, and when the cartridges are actuated, the gas therefrom will inflate the entire raft within a moment or two. Because of the large volume of the raft when it is inflated, because of the use of multiple gas cartridges, the pressure exerted by the walls of the raft while it is inflating is high. The cartridges are often actuated by the ejection of the life raft from the airplane under emergency conditions.

Such life rafts are stored in deflated condition within a relatively small storage compartment in aircraft. The storage compartment may be in the fuselage or in the wing pods. Should the life raft while in storage accidentally inflate, that is, inflate under conditions when the person in charge of the vehicle does not wish it to do so or under non-emergency conditions, it may cause buckling of the storage walls, may burst and harm passengers in the vehicle, and may in fact destruct external walls of the vehicle itself. For this reason, a safety device is required which can be located immediately adjacent to the life raft storage compartment and which can cause immediate rupture and deflation of the life raft, should it accidentally start on its inflation process.

Accordingly, it is the primary object of the present invention to provide a safety assembly which will cause rupture and deflation of a life raft which is accidentally inflating, when the raft is stored within a vehicle stowage compartment.

It is a further object of the present invention to provide a rupture assembly of the character described which is simple in operation, few in its number of parts, economical in manufacture, and which can be fixed to a life raft storage compartment in a vehicle with relative ease.

It is still a further object of the present invention to provide a rupture assembly of the character described which inhibits its own actuation and thus rupture of the life raft walls, as during small shifts and vibration of the life raft and during flexing of the storage compartment walls, which might take place during vehicle motion, and which removes any such resistance to rupture when the raft actually inflates under accidental circumstances.

In general, and in accordance with the teaching of the present invention, there is provided a safety rupture assembly which is intended to deflate a life raft upon accidental inflation thereof, while the life raft is contained in its storage compartment in a vehicle. The assembly includes a housing which is fixed to the life raft storage compartment about an access opening which leads into the storage compartment. The housing includes a ring-like cutting blade, the cutting blade facing the access opening. A flexible diaphragm is situated over the access opening, and a spring resistance normally keeps the diaphragm out of contact with the cutting blade. When the life raft accidentally inflates, a wall segment thereof attempts to expand through the access opening and in so doing urges the diaphragm against the spring resistance and towards the cutting blade. The spring resistance is of the "snap" type so that when the pressure exerted thereon reaches a certain level, the spring resistance collapses. At this point, the pressure on the life raft wall causes it and the diaphragm to come into sharp contact with the cutting blade whereupon the cutting blade pierces the diaphragm, cuts through the life raft wall, and causes immediate rupture and deflation of the life raft.

Other objects, features, and embodiments of the invention are contemplated and will be apparent from the following more detailed description with reference to the accompanying drawings, wherein.

Figure 1:
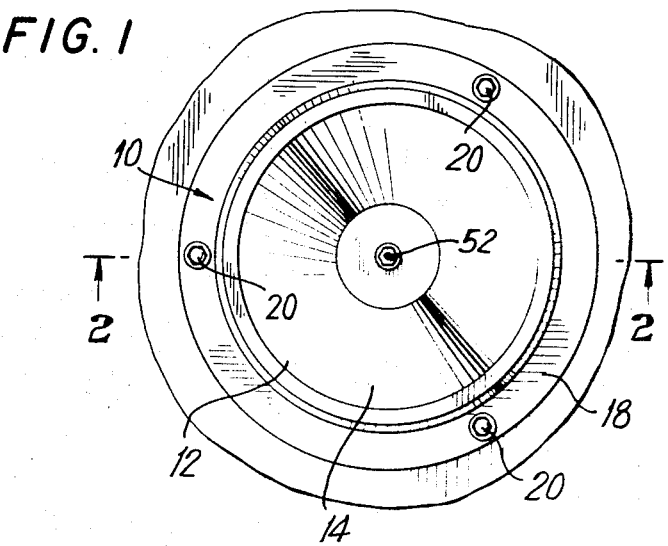
FIG. 1 is a top-plan view of the safety rupture assembly, fixed to a life raft storage compartment of a vehicle.

Referring now in detail to the drawings, a segment S of a wall of a life raft, usually made of natural or synthetic rubber, is shown immediately adjacent to the wall of a container, only a portion C of such container wall being illustrated. The raft in deflated condition is in the compartment for storage purposes. Such containers are usually formed of fiberglass or plastic material and are relatively rigid. The container wall C has an access opening O formed therein, said opening being desirably circular in plan.

The rupture assembly 10 is situated immediately adjacent to but externally of the container wall C. The assembly includes a bell-shaped housing 12 which includes a depressed crown 14, having an encircling side wall 16 and a protruding flange 18. Fastening means, typically bolts 20, fix the housing 12 to the container wall C over the access opening O in a conventional manner. The side wall 16 may include a number of ports 22 which both permit inspection of the interior of the housing 12, and as will be seen, permit exhaustion of gas.

The life raft segment S presses against the wall C and spans the access opening O, and may bulge slightly outwardly through said opening. The rupture assembly 10 further includes a diaphragm 24 composed of sheet stock of a relatively tough but pliable material. The diaphragm 24 is strengthened by a support member 25. Certain rubber or plastic sheet materials are conventional for this purpose. The diaphragm is retained in place over the access opening O by the bolts 20 and by the pressure of the flange 18 against the portion of the container wall C surrounding the access opening O. The diaphragm closes the opening O and thus retains the life raft within its storage compartment, and also prevents the passage of foreign material through said access opening into the life raft storage area.

The rupture assembly 10 further includes a cutting member 26 which comprises a flange 28, a bridge 30, and a cutting blade 32. The cutting blade is in the form of a circular band with the cutting blade being positioned by the bridge 30 over and relatively close to the access opening O with the circular tip of the blade facing the opening.

Figure 2:
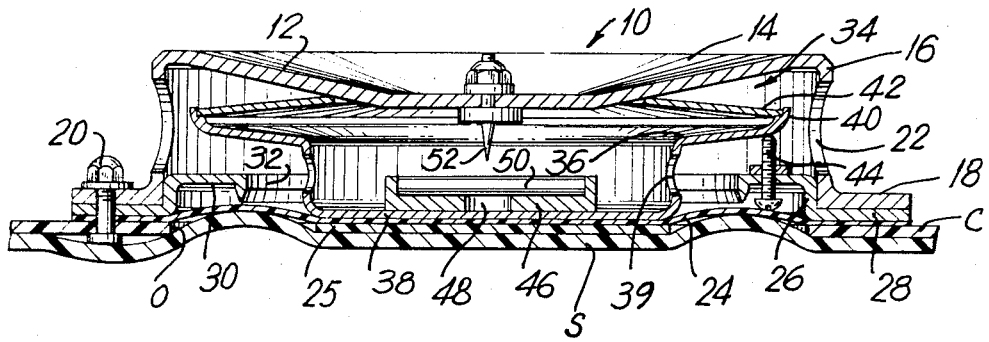
FIG. 2 is an enlarged cross-sectional view of the safety rupture assembly taken substantially along the line 2—2 of FIG. 1.
Figure 3:
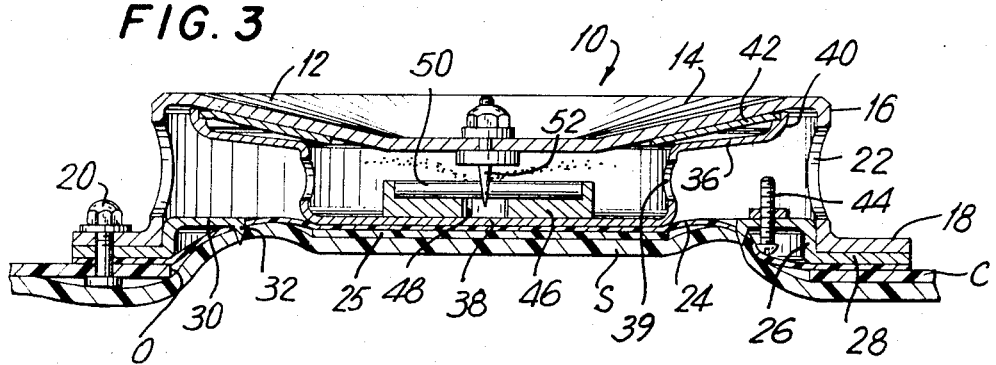
FIG. 3 is a view similar to FIG. 2 but showing the assembly in a posture having just ruptured an accidentally-inflated life raft.

A spring resistance mechanism 34 is situated within the housing 12 and includes a bowl 36 having a floor 38 resting on the diaphragm 24 centrally of the opening O. The bowl has a rim 40 which supports, at its outer edge, a bi-stable centrally apertured spring disc 42. The inner edge of the spring disc 42 abuts the interior face of the housing crown 14. The spring disc 42 is of the "snap" type which initially assumes an outwardly convex configuration (FIG. 2) but which, when sufficient pressure is applied to its interior edge with respect to its outer edge, quickly snaps to an outwardly concave position (FIG. 3).

Adjustment means are provided to precisely position the spring mechanism 34 within the housing 12 between the crown 14 and the diaphragm 24. Such adjustment means may comprise a circumferentially spaced series of screws 44 which pass through the bridge 30. The screws may be rotated towards or away from the crown 14, and in so doing, the tips of the screws 44 fix the position of the bowl 36 and the spring disc 42. These screws also enable some preloading of the disc 47, by urging the same against the crown 14.

Turning now to the operation of the rupture assembly, under normal conditions a life raft of the self-inflating type having a wall segment S is stored in collapsed condition in a storage compartment which is defined in part by a container wall C. An access opening in the container wall C is covered by the pliable diaphragm 24. Should there be an accidentally-caused inflation of the life raft, gas pressure within the life raft will cause life raft wall segment S to start protruding outwardly through access opening O, such movement of the segment S causing similar outward stretching of the diaphragm 24. During the initial stages of such movement, the outward expansion of the diaphragm 24 and the segment S is opposed and resisted by the spring resistance mechanism 34. More specifically, as the segment S and the diaphragm 24 move outwardly through the access opening, they simultaneously move the bowl 36 towards the crown 14 and such movement is impeded by the resistance-to-flexing of spring disc 42, which engages both the crown 14 and the rim of the bowl 36. The mentioned resistance of the spring resistance mechanism 34 is sufficient to prevent the rupture assembly from operating, due to small movements of the segment S and flexing of the container wall C, as are likely to take place when the transport vehicle is in motion.

Should the movement of the segment S and the diaphragm 24 continue, as would happen as the gas from a gas cartridge continues to expand the life raft, the bowl 36 would continually be moved further towards the crown 14. At a certain point, the spring disc 42 would "snap" from its upwardly convex position (see FIG. 2) to its upwardly concave position (see FIG. 3), and at that point, the bowl 36 would continue its movement towards the crown 14, unhindered by the spring disc 42. This sudden collapse of the spring resistance enables the diaphragm 24 and the segment S to move in an accelerated manner under the urging of the life raft's gas pressure towards the cutting blade 32, whereupon the cutting blade pierces both the diaphragm and the life raft wall segment causing a rupture therein and permitting gas to escape through said rupture and thereupon through the ports 22. Hence, an immediate deflation of the life raft is caused preventing harm to the vehicle structure as well as to persons or freight therein.

Under certain circumstances, it may be desirable for the operation of the rupture assembly to yield some sort of a sensory signal, which may include a visual signal, an odoriferous signal or some combination of these. For this purpose, a pod 46 is fixed upon the floor 38 of the bowl 36 and includes a gas chamber 48 filled with an appropriate gas. A red-dye gas would well serve this purpose. The chamber 48 is capped by a pierceable cover 50. A piercing blade 52 is fixed by conventional fastening means to the center of the crown 14 and points towards the pod. When the bowl 36 is moved towards the crown 14 during the operation of the rupture assembly, the blade 52 pierces the cover 50 and enters into the chamber 48 permitting the gas therein to exhaust through ports 39 in the bowl 36 and then through ports 22 in the housing 12. Thus, persons in the area will see that the rupture assembly has operated so that they thereupon can replace the raft within the storage compartment. The aforesaid signaling device is especially valuable should the vehicle be unattended for substantial periods of time since during such times, no one would hear the inflation and consequent rupture of the life raft.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A rupture assembly for deflating an inflatable, such as a life raft or the like, stored in a deflated condition within a container having an opening with the inflatable having a portion thereof spanning said opening, said assembly comprising a cutting member adapted to be situated over and oriented towards said opening, and means adjacent the cutting member for resisting initial movement of the inflatable through the opening and collapsible upon further movement of the inflatable, whereby the inflatable upon said collapse is ruptured by the cutting member.

2. For use with a life raft stored in deflated condition in a compartment in a vehicle, the compartment having an access opening with a portion of the life raft wall spanning said opening, a safety assembly for rupturing and deflating said life raft upon accidental inflation thereof within the compartment, the assembly comprising a housing fixed about the access opening, a pliable diaphragm closing the opening, a cutting member situated within the housing and oriented towards the opening, and spring means contained within the housing and resisting, to a limited extent, the movement of the diaphragm towards the cutting member, whereby when the raft is accidentally inflated, the life raft wall moves the diaphragm towards the cutting member through the opening, overcoming the spring means, so that the cutting member ruptures both the diaphragm and the life raft wall.

3. A safety assembly as set forth in claim 2 wherein the spring means collapses upon the movement of the diaphragm to a predetermined extent.

4. A safety assembly as set forth in claim 3 wherein the spring means includes a bi-stable disc which snaps between opposed orientations.

5. A safety assembly as set forth in claim 3 wherein positioning means locates the spring means within the housing.

6. A safety assembly as set forth in claim 4 wherein the housing is a bell-shaped member, and the spring means includes a bowl-shaped member which rests on the diaphragm and which has a rim which engages the spring disc.

7. A safety assembly as set forth in claim 3 wherein the cutting member comprises a band with a cutting edge.

8. A safety assembly as set forth in claim 6 wherein the housing has a number of ports to permit exhaustion of gas therethrough.

9. A safety assembly as set forth in claim 2 further including signaling means operable upon the rupture of a life raft.

10. A safety assembly as set forth in claim 9 wherein the signaling means comprises a gas container situated within the housing, a sensory gas within said container, and a piercing member carried by the housing, movement of the diaphragm towards the cutting member simultaneously causing the gas container to move towards and to be severed by the piercing member.

* * * * *